United States Patent [19]

Schneider et al.

[11] Patent Number: 4,933,832
[45] Date of Patent: Jun. 12, 1990

[54] AUTOMATIC LINE MONITOR

[75] Inventors: Michael E. Schneider, Conroe; Richard A. Faulk, Cypress, both of Tex.

[73] Assignee: Compaq Computer Corp., Houston, Tex.

[21] Appl. No.: 365,099

[22] Filed: Jun. 12, 1989

[51] Int. Cl.$^5$ ............................................. H02M 7/10
[52] U.S. Cl. ...................................... 363/143; 363/61; 363/81
[58] Field of Search .................... 363/61, 142, 143, 81; 323/300

[56] References Cited

U.S. PATENT DOCUMENTS 4,665,323  5/1987  Russel et al. ........................ 363/143
4,780,805 10/1988  Chewuk et al. ...................... 363/143
4,845,607  7/1989  Nakao et al. ........................ 363/143

FOREIGN PATENT DOCUMENTS 89061  4/1988  Japan .

OTHER PUBLICATIONS

"Automatic Input-Selecting Power Supply," IBM Tech. Discl. Bul., vol. 28, No. 3, pp. 1246, 1247, Aug. 1985.

Primary Examiner—William H. Beha, Jr.
Attorney, Agent, or Firm—Arnold, White & Durkee

[57] ABSTRACT

An automatic line monitor for use in conjunction with a power supply for electronic components automatically accommodates either of two voltage ranges. Since the power supply may operate in domestic voltage ranges of about 100 volts or in international voltage ranges of about 120, the automatic line monitor senses and automatically switches to a voltage-doubling mode for the domestic range or a non-voltage-doubling mode for the higher international range. A latch may latch the line monitor in a non-voltage doubling mode once the higher voltage range is sensed. A monitor of a preferred embodiment eliminates almost all of the high-power-handling elements of the switch so that almost all of the operative elements of the switch may be incorporated on a single integrated circuit chip.

7 Claims, 5 Drawing Sheets

AUTOMATIC LINE MONITOR

BACKGROUND OF THE INVENTION

1. Field of the Invention

This invention relates generally to an automatic line monitor ("ALM") and more particularly to a monitor to control a switch that automatically accommodates line voltages in either the 110 volt range or the 220 volt range.

2. Description of the Prior Art

Some electronic power supplies operate at various AC input voltages, such as 110 volts and 220 volts. Some of these power supplies provide a jumper from a full-wave bridge rectifier that enables or disables a voltage doubler in the form of a pair of series-connected capacitors. With the jumper installed, rectified input voltage is applied in turn to each of the capacitors, each during its respective half-cycle That is, during one half-cycle, one capacitor receives an input charge and, during the next half-cycle, the other capacitor receives an input charge. In this way, with output voltage taken across both capacitors, the power supply provides a doubled voltage. With the jumper removed, the full-wave bridge rectifier impresses the rectified input voltage across the series combination of the two capacitors, rather than to each in turn, and the power supply operates in a non-voltage-doubling mode.

Other power supplies provide a switch in place of the jumper. A portion of the power supply senses voltage level, whether in the 110 volt range or in the 220 volt range. If the power supply senses the 110 volt range, the circuit shuts the switch providing the voltage-doubling mode as previously described. If the power supply senses the 220 volt range, the circuit opens the switch (or leaves the switch open, depending on "fail safe" operation) and the power supply operates in a non-voltage-doubling mode. In this way, the power supply provides the same output voltage regardless of the input voltage range.

Some power supplies provide a solenoid operated switch to effect the mode of operation. However, solenoids can be rather large and expensive, they suffer from certain reliability problems, and they can dissipate a relatively large amount of power.

Other known power supply circuits employ a triode or triac to accomplish the switching function. However, known control circuits for these switching arrangements generally provide an inadequate tolerance band between voltage ranges and provide some uncertainty in the point at which the switch is (de)activated due to manufacturing variations in the switch and other circuit elements. Also, known control circuits for these switching arrangements tend to be large and dissipate too much power.

SUMMARY OF THE INVENTION

The present invention provides an automatic line monitor that detects the range of the incoming line voltage and automatically provides the appropriate output voltage. In a preferred embodiment of the invention, the monitor provides a latch that ensures that the switch remains in a non-voltage-doubling mode. In this embodiment, once the monitor detects the higher input voltage range, such as for example above approximately 220 volts RMS, a latch effectively prevents the switch from effecting a voltage-doubling mode. In the event that input voltage is lost or drops below a predetermined threshold, the input voltage will not be doubled once input voltage returns.

It would also be advantageous to provide a power supply that accommodates a wide range of variations in input voltage in a manner that is simple and inexpensive.

It would also be advantageous to provide an automatic line monitor that precisely controls trip set-points between high and low voltage ranges.

It would further be advantageous to provide an automatic line monitor that can be incorporated on a single semiconductor chip with the exception of a few power elements and optical components.

Further advantages of the present invention will become apparent to those of skill in the art as the operations of the preferred embodiments are detailed below.

DESCRIPTION OF PREFERRED EMBODIMENTS

Table 1 lists the preferred values for the various circuit elements.

Figure 6:
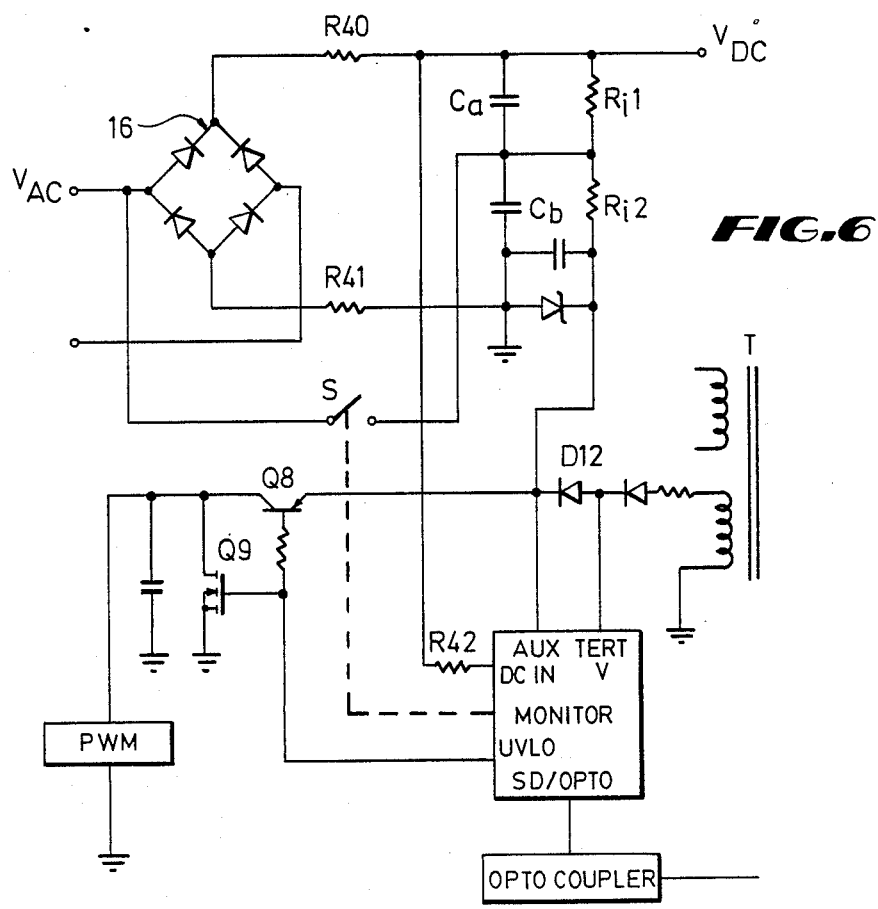
FIG. 6 is an electrical schematic diagram of a power supply showing the control operation of the present invention.

FIG. 6 depicts a power supply circuit with the automatic line monitor of the present invention. A full-wave bridge-rectifier 16 receives input line-voltage at Vac and provides a rectified voltage to the power supply. The position of a switch S determines the voltage doubling or nondoubling mode of the power supply. The monitor of the present invention determines the position of the switch S depending on the sensed voltage range.

A pair of thermistors R40,R41 limit the in-rush current into the bulk capacitors Ca,Cb. Ri1 and Ri2 are the bleeder resistors. The voltage developed at the lower node of resistor Ri2 is referred to as the AUX voltage. Another voltage is derived off a tertiary winding of the main power supply transformer T and is isolated by a diode D12. This voltage is applied when the power supply main switches turn on. The DC input voltage is monitored through a resistor R42. An out-of-specification condition, as determined by an external circuit, provides a shutdown signal at SD/OPTO which will shut down the UVLO circuit.

The power supply of FIG. 6 provides a timing constraint. The AUX voltage and DCin must first be at acceptable levels. A delay permits the switch S to shut, then a short delay at UVLO will allow the pulse-width modulator ("PWM") to come on. That is, Q8 turns on and Q9 turns off.

Figure 1:
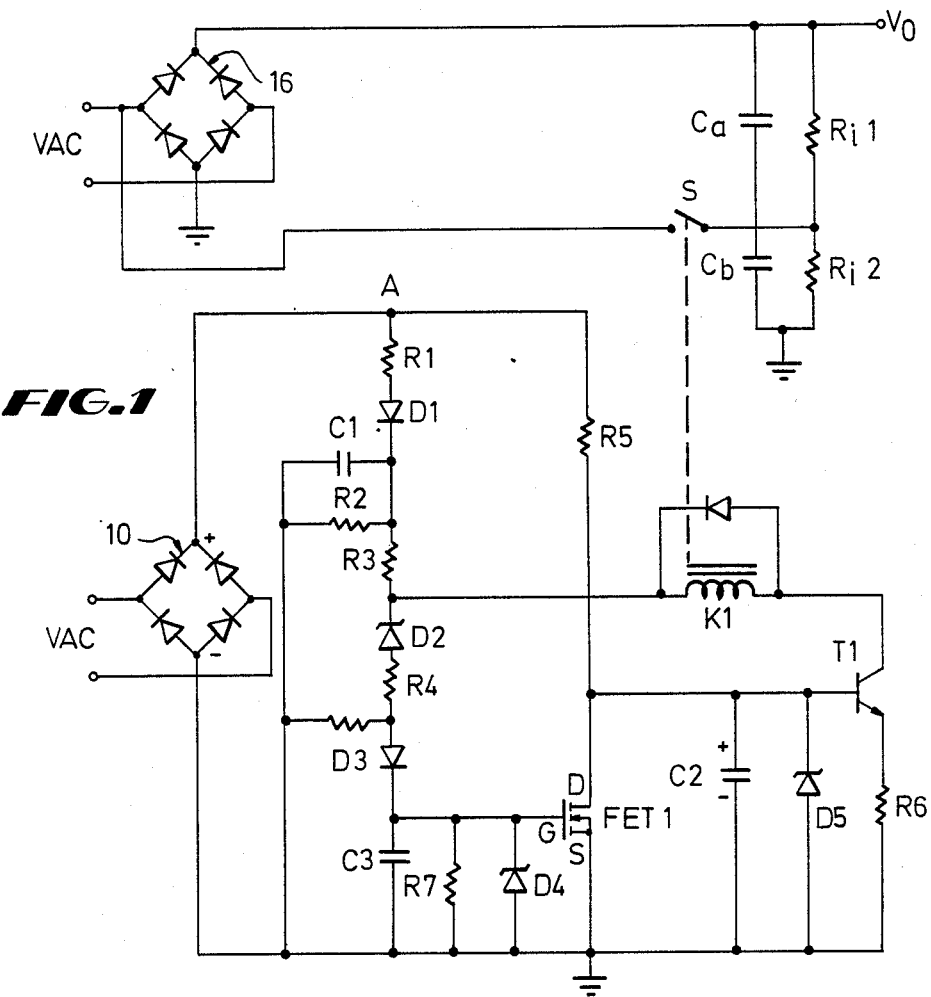
FIG. 1 is an electrical schematic diagram of an automatic line monitor according to one embodiment of the present invention.

FIG. 1 depicts an automatic line monitor of the present invention and a circuit that is controlled by the present invention. A full-wave bridge rectifier 16 rectifies an input voltage Vac. The present invention controls the position of a switch S. With the switch S closed, each of a pair of capacitors Ca and Cb is charged by the rectified input voltage on its respective half-cycle. In this way, the voltage provided at the output voltage, Vo, is doubled. With the switch S open, each half-cycle simply charges the series combination of the capacitors Ca and Cb and the voltage provided at Vo is one half that provided with the switch S shut. The capacitors Ca and Cb may be referred to as "bulk capacitors." A pair of power resistors Ri1 and Ri2 provide a bleeder path to discharge the bulk capacitors when the power supply is turned off.

The present invention provides an automatic line monitor that detects a condition that dictates whether the switch S should be open or shut.

The monitor circuitry receives the same input line voltage, Vac, into a full-wave bridge rectifier 10. This rectified input voltage provides both the voltage for sensing voltage level and for powering the switch at a node A. For the voltage-level sensing network, the rectified input voltage is passed by a resistor R1 and a diode D1 where it is filtered by a parallel combination of a capacitor C1 and a resistor R2. This filtered input voltage is then monitored by a high-voltage Zener diode D2 by way of a resistor R3. In "international" (i.e., high-voltage range) mode, the diode D2 turns on (conducts) providing voltage to the gate of an FET1 via a resistor R4 and a diode D3. This turns on the FET1 effectively grounding the base of a bipolar transistor T1. In this way, the transistor T1 does not conduct and no current is provided to the relay K1.

In "domestic" (i.e., low voltage range) mode, the Zener diode D2 does not conduct and the FET1 is therefore off. Thus, charge is conducted through a resistor R5 to charge a capacitor C2 providing a forward bias across the base-emitter junction of the transistor T1. With the transistor T1 conducting, sufficient current is drawn through a resistor R6 to pick up the relay K1.

The circuit values for the various components, as shown in Table 1, provide a careful timing sequence. The RC time constant for the combination of the resistor R5 and the capacitor C2 dictate that the voltage across the resistor R6 (and therefore the current through the transistor T1 conducted to the relay) reaches a proper value to pick up the relay at about 100 milliseconds. The values for the resistor R4 and a capacitor C3 provide a much shorter time constant so that two things happen. The resistor R4 and the capacitor C3 provide for some delay so that the FET1 is not triggered during short duration line transients. On the other hand, in power-up in "international" mode, the FET1 is triggered before the transistor T1 can pick up the relay thereby avoiding the voltage-doubling mode in the higher voltage ranges.

A parallel combination of a resistor R7 and a Zener diode D4 provide gate-to-source protection for the FET1. Another Zener diode, D5, acts as a current regulator to provide a source of constant current to the relay. Providing a constant-current source to the relay reduces the cost of the ALM since power to pick up and hold the relay is carefully controlled.

Figure 2:
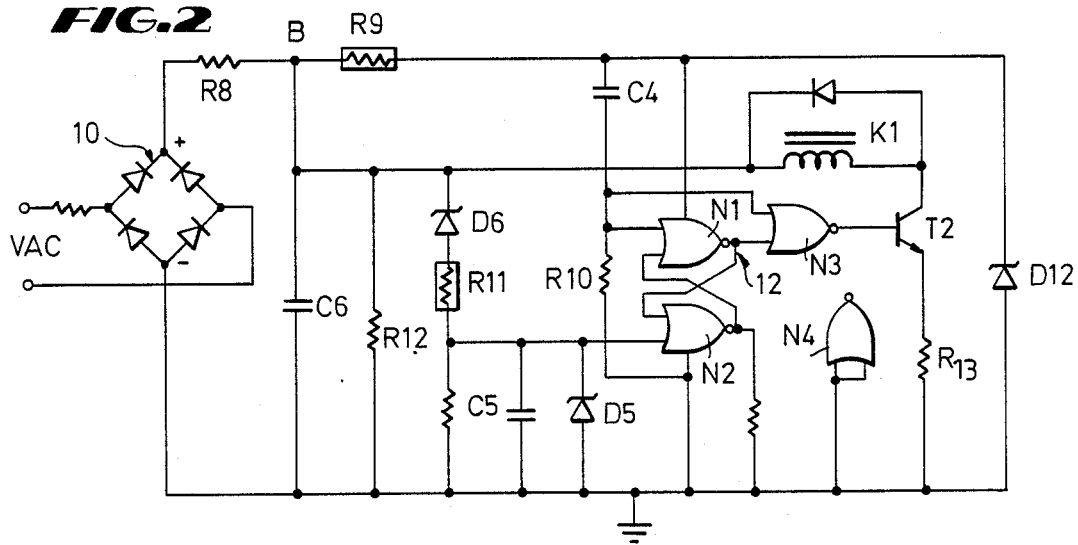
FIG. 2 is an electrical schematic diagram of an automatic line monitor with a latching feature.

FIG. 2 depicts another preferred embodiment of the present invention that further provides a latching feature. As before, AC line voltage, Vac, is rectified by the full-wave bridge rectifier 10. This voltage is provided to a node B by a resistor R8. The voltage from the node B follows three paths: the node B powers the relay K1, powers the monitor circuit through a resistor R9 and provides input voltage sensing to the monitor circuit through a diode D6. The resistor R9 provides a maximum of 12 volts, regulated by a Zener diode D12, to a set of NOR gates N1-N3 configured as a flip-flop 12. The inputs to the unused NOR gate N4 are grounded to ensure proper operation of the flip-flop.

In the event the ALM senses a line voltage in the "international" range, a Zener diode D6 conducts providing a logical "1" to N2 triggering the flip-flop 12. If the flip-flop does not trigger during the time-out of the "reset" combination of a resistor R10 and a capacitor C4, the NOR gate N3 provides approximately 12 volts to the base of a transistor T2. The transistor T2 conducts providing a source of constant current to the relay as before. This current is the voltage at the base of the transistor T2 minus the base-emitter voltage, this difference divided by the resistance of a resistor R13. Also as before, a much shorter time constant of a combination of a capacitor C5 and a resistor R11 protect the circuit in the event of a short duration line transient. A parallel combination of a capacitor C6 and a resistor R12 filter the rectified input voltage.

Figure 3:
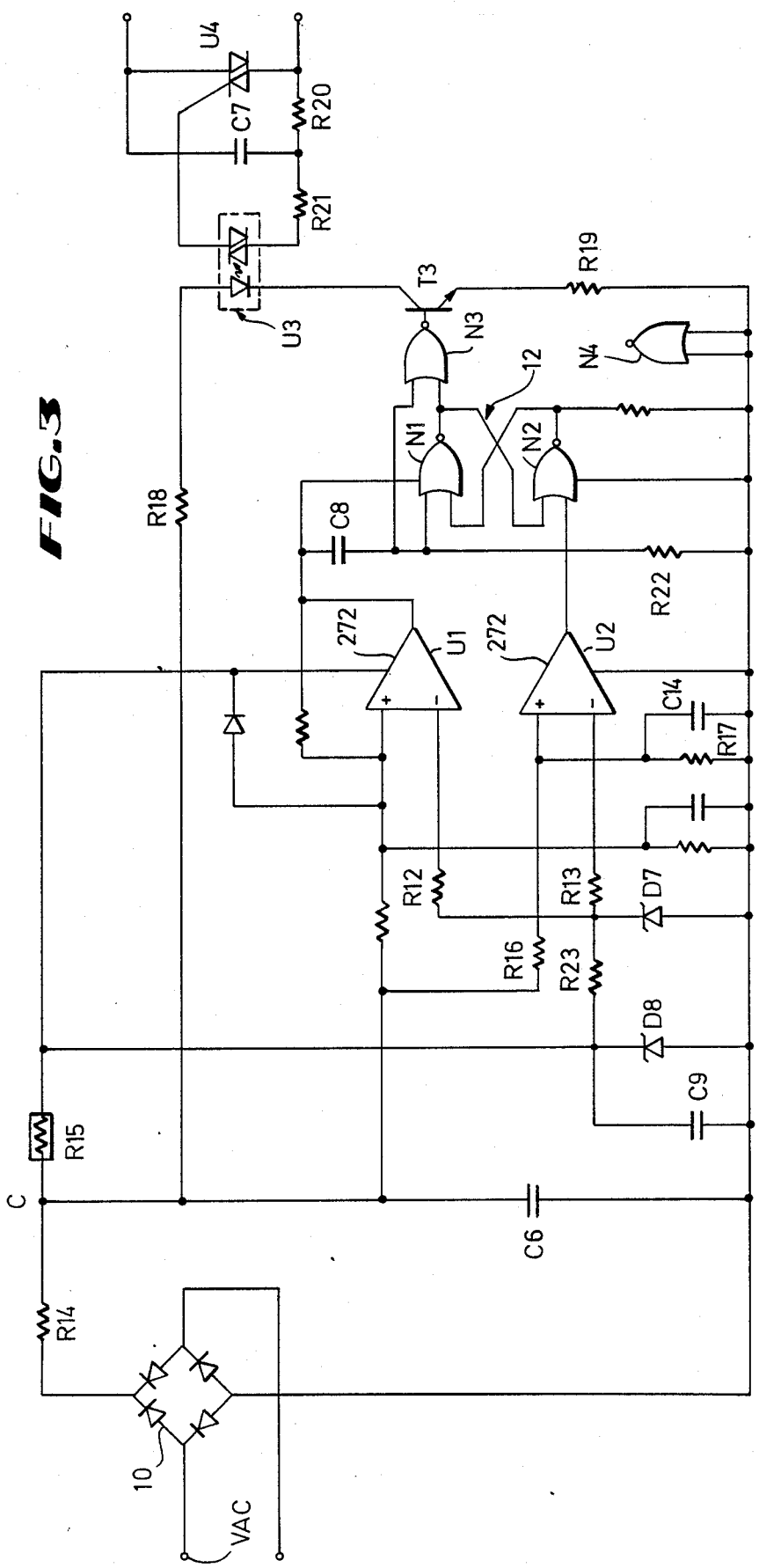
FIG. 3 is an electrical schematic diagram of an automatic line monitor that further provides a comparator to improve accuracy, and that replaces the relay switch with solid state devices.

FIG. 3 depicts still a further embodiment of an ALM that in this case includes a comparator, thus eliminating the need for the Zener diode D2 of FIG. 1 or the Zener diode D6 of FIG. 2. In addition, the circuit of FIG. 3 replaces the relay with solid state devices. The ALM of FIG. 3 advantageously provides for closer tolerances in the operation of the switch. A reference Zener diode D7 (in a preferred embodiment an LM385 as shown in Table 1) provides an accurate 2.5 volt reference to the inverting inputs of a pair of comparators U1-U2 via a pair of resistors R12 and R13, respectively.

In this embodiment, the input voltage Vac is rectified by a full-wave bridge rectifier 10 and passed to a node C via a resistor R14. A capacitor C6 filters the rectified input voltage. Power for the comparators U1 and U2 and the NOR gates N1-N3 is provided through a resistor R15 and a diode D8 provides the limit for the Vcc of these components. As before, the inputs to the NOR gate N4 are grounded to ensure proper operation of the flip-flop 12.

The ALM samples the rectified and filtered input voltage through a precision resistor R16 into the non-inverting input of the comparator U2. The ratio of the resistances of the resistor R16 and a voltage-divider precision resistor R17 provides the trigger set-point for the "international" range, in a preferred embodiment about 140 volts. Once the voltage at the non-inverting input of the comparator U2 reaches about 2.5 volts as set by the Zener diode D7, the comparator U2 triggers the flip-flop 12. The output of the NOR gate N3 thus goes low turning off the transistor T3. This disables an opto-coupler U3 and prevents the voltage-doubling mode.

In "domestic" mode, the flip-flop 12 provides about 12 volts to the base of the bipolar transistor T3. A resistor R18 provides biasing power to the transistor T3 and the transistor T3 conducts a current dictated by the resistance of a resistor R19. This action provides current to the optocoupler U3. The output of the opto-coupler U3 drives a high-power triac U4 that operates as the switch S in FIG. 6. A pair of precision resistors R20 and R21 and a capacitor C7 provide precise control of the triac U4 and filter large excursion voltage transients on the line.

The diode D8 also acts indirectly as a reference for the current source because it clamps the output of the flip-flop 12 to about the Zener limit of the Diode D8 (less a small voltage drop through the logic gates). This permits accurate prediction of the current developed across the resistor R19 and thus the current provided to the opto-coupler U3.

As before, the ALM of the present invention quickly senses a "domestic" or "international" range of input voltage. The ALM must disable the voltage-doubling mode when it senses the higher "international" range. In the embodiment of FIG. 3, a series combination of a capacitor C8 and a resistor R22 decide when to switch to the "domestic" voltage-doubling mode during power-up in about 50 milliseconds. However, in the event of the higher "international" voltage range and before the ALM can switch, a shorter time constant combination of a pair of resistors R16,R17 and a capacitor C14 will have latched the flip-flop 12 preventing the voltage doubling mode.

Figure 4:
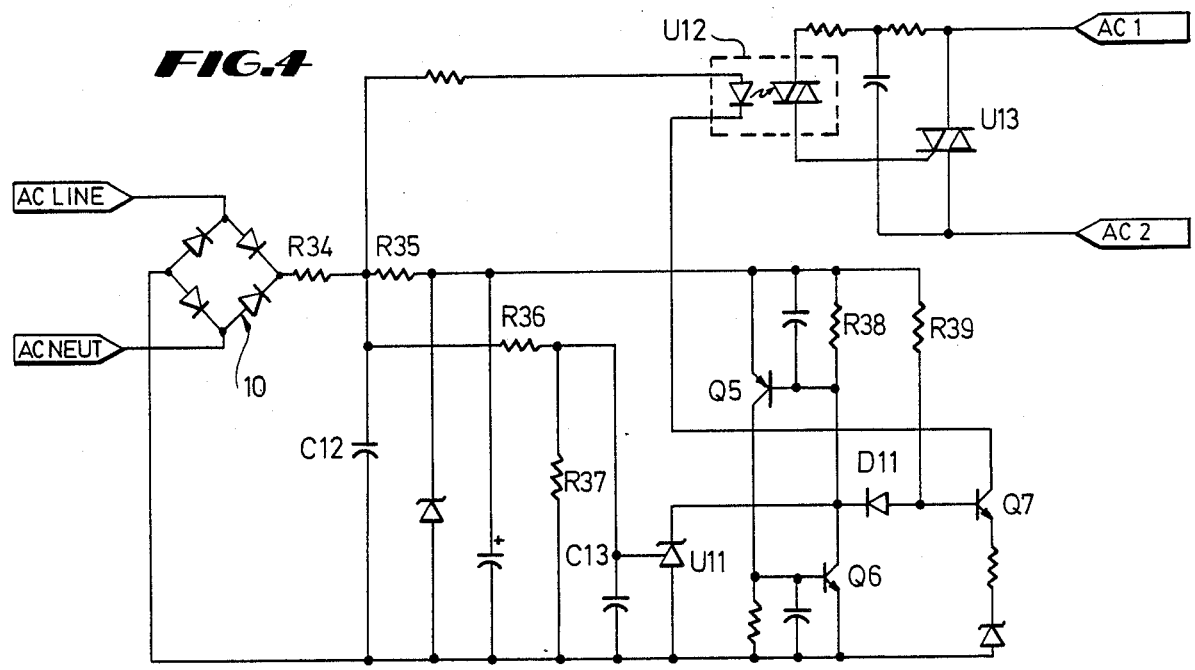
FIG. 4 is an electrical schematic diagram of a low cost automatic line monitor embodying the present invention.

FIG. 4 depicts another embodiment of the present invention. This embodiment employs a comparator U11 and a latch comprising a pair of transistors Q5 and Q6. As in embodiments previously described, a full-wave bridge rectifier, a pair of resistors R34 and R35, and a capacitor C12 provide the ALM with rectified and filtered input voltage. The ratio of the resistances of a pair of resistors R36 and R37 provides the trip set-point for the comparator U11 acting in its role as "international range" detector, that of about 140 VRMS input line voltage. When the comparator U11 turns on, it draws current through a resister R38 and through the emitter-base junction of the transistor Q5. This action turns on Q5 thus injecting current into the emitter-base junction of the transistor Q6, turning it on. With Q6 on, it continues to draw current from Q5, thereby forming a latch. The resistor R36 and a capacitor C13 inhibit operation of the "international range" detector for very short-duration high-voltage transients.

In the international voltage range, Q6 conducts as previously described. This action pulls down the base of a transistor Q7 through a diode D11, thereby turning off Q7. This disables an opto-coupler U12 and consequently its associated high-power triac U13. In domestic range, the latch will not trip and the base of the transistor Q7 will be biased by the rectified and filtered input voltage through a resistor R39. This turns on the transistor Q7 and activates the optocoupler and the high-power triac, enabling the voltage-doubling mode of operation.

Figure 5:
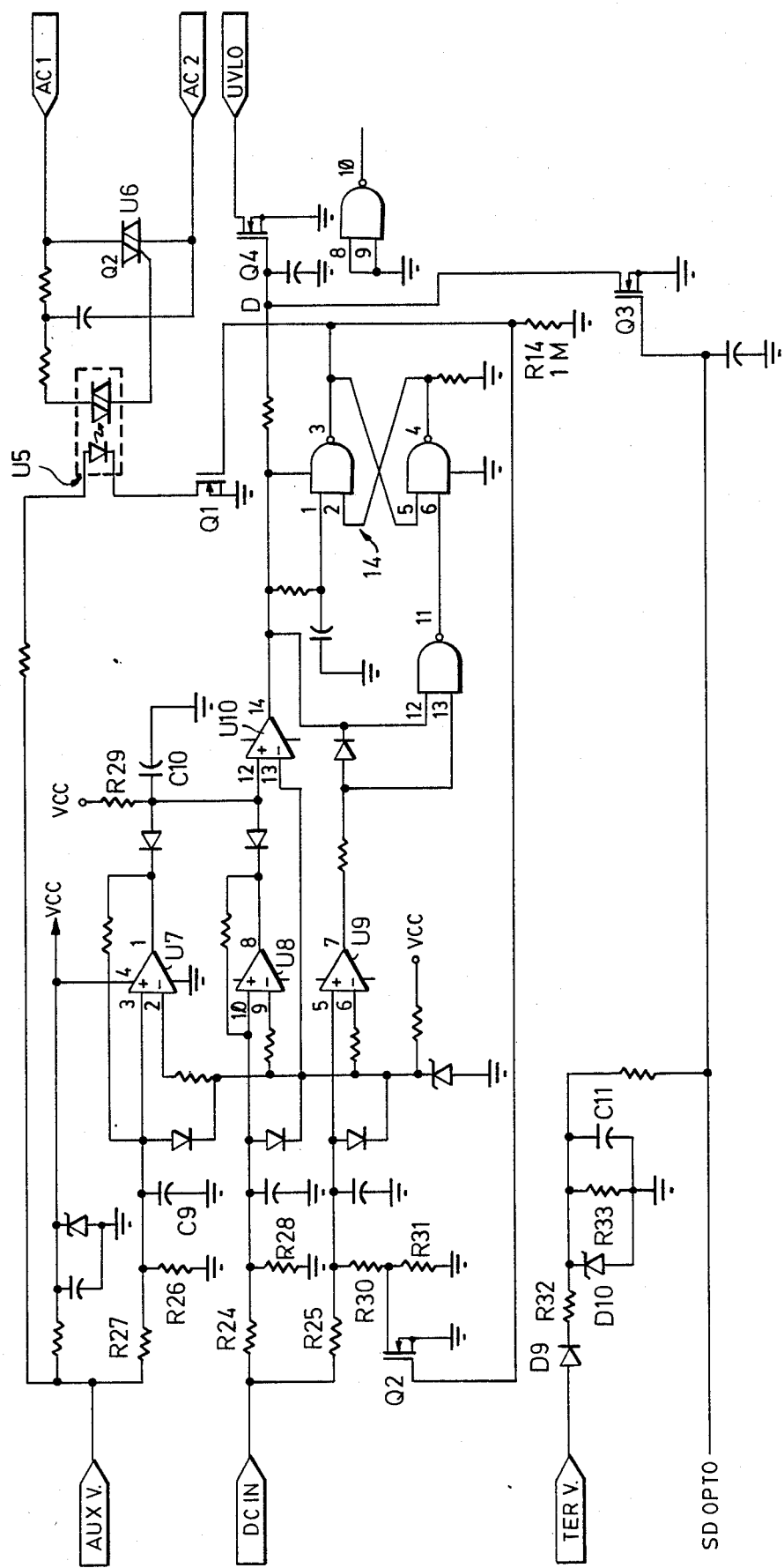
FIG. 5 is an electrical schematic diagram of a tertiary powered automatic line monitor of the present invention that provides control circuitry that can be implemented in low voltage, low-power custom integrated-circuit applications.

FIG. 5 depicts another embodiment of the present invention. The embodiment of FIG. 5 eliminates most of the high-power components of other embodiments and thus can be built on a single semiconductor chip. A pair of power resistors R24 and R25 and the optical components U5 and U6 remain as discreet components but the rest of the circuit may be included in a single integrated circuit.

The embodiment of FIG. 5 requires no full-wave bridge rectifier; rather the auxiliary ("AUX") voltage of the power supply (as described with regard to FIG. 6) provides the input power via the AUX V. input. The AUX voltage is typically 10-15 volts and is available to the ALM as soon as AC line voltage is applied to the power supply. As soon as the pulse-width modulator of the power supply starts operating, a tertiary winding of the power supply's main transformer feeds power to the AUX filter capacitor reducing the need for power from the power supply's bulk capacitors.

A comparator U7 accepts input voltage from the AUX V. input. A resistor R26 and a capacitor C9 further filter the AUX voltage and the ratio of the resistor R26 and a resistor R27 determines the set-point at which the comparator U7 triggers, typically at about 13 volts input. The output of the triggered U7 is then "ANDed" with the output of a comparator U8. The comparator U8 may also be referred to as the "domestic range" comparator. The DC IN voltage is the DC bulk voltage of the power supply (shown in FIG. 6) and the ratio of the resistances of a pair of resistors R24 and R28 determines the trip set-point of the comparator U8. The "ANDed" outputs of the comparators U7 and U8 feed the noninverting input of a comparator U10. A resistor R29 and a capacitor C10 provide the necessary delay before triggering the voltage-doubling mode as previously described. After that suitable delay, if the ALM determines that the voltage doubling mode is required, a switch Q1 turns on providing power to the opto-coupler U5 turning on the high-power triac U6. The high-power triac acts as the switch S of FIG. 6, enabling the voltage doubling mode.

The switch Q1 in this embodiment need not be a current source as in other embodiments because the auxiliary voltage is well known and not subject to the variations of the AC line voltage, such as between the domestic and international ranges.

The comparator U9 acts as the "international range" comparator. Above the set-point set by the ratio of the resistances of the resister R25 and the series combination of a pair of resistors R30 and R31, comparator U9 triggers. This triggers the latch 14, in this case shown embodied in a set of NAND gates. With the output of the latch 14 high, the gate of the transistor Q1 is forced high, effectively disabling the switch and thereby preventing the voltage-doubling mode.

The output of the latch 14 also feeds a signal to the gate of a switch Q2. The switch Q2 varies the set-point of the "international range" comparator U9. With the output of the latch 14 low, the switch Q2 conducts, shorting across the resister R31 setting a first-set-point. With the output of the latch 14 high, the gate the switch Q2 is forced high, turning off the switch Q2, thereby doubling the set-point.

The switch Q2 is necessary because the ALM of FIG. 4 uses the DC voltages already present in the power supply. During power-up of the power supply in the domestic range, the voltage into the ALM would be doubled and this would trigger the "international range" comparator thus disabling the voltage-doubling mode.

The embodiment of FIG. 5 may also include power supply features known in the art, such as a shutdown circuit. A shutdown circuit allows the power supply to be disabled in the event of an out-of-specification condition as determined by external circuitry. Including these features in the embodiment of FIG. 5 simplifies the rest of the power supply circuitry.

A logic "low" signal on the ALM "SD OPTO" input disables the power supply through a switch Q3 and a switch Q4.

Inadvertent shutdown action is prevented by a tertiary ("TER V.") input. A tertiary winding on the main transformer of the power supply provides a voltage to the tertiary input. This provides a sense input to detect exactly when the pulse-width modulator has turned on. Inadvertent shutdown action is prevented by a circuit comprising a pair of diodes D9 and D10, a pair of resistors R32 and R33, and a capacitor C11. This circuit provides a delay to allow the secondary voltages of the power supply to come up after the tertiary voltage has begun and that delay gives the shutdown circuit on the secondary time to respond.

The foregoing specification describes the principles, preferred embodiments, and modes of operation of the present invention. The invention is not to be construed as limited to the particular forms disclosed, since these are regarded as illustrative rather that restrictive. Moreover, those skilled in the art may make variations and changes without departing from the spirit of the invention.

TABLE 1
PREFERRED COMPONENT VALUES

| Resistors (Ohms) | | | Capacitors (Microfarads) | |
|---|---|---|---|---|
| Ri1 | 22K | (2 watts) | C9 | .1 |
| Ri2 | 22K | (2 watts) | C10 | .1 |
| R1 | 100 | | C11 | 2.2 |
| R2 | 330K | | C12 | 1 |
| R3 | 1K | | C13 | .10 |
| R4 | 47K | (2 watts) | Transistors | |
| R5 | 100K | (2 watts) | FET1 | IRFZ1D3 or 2N7000 |
| R6 | 1460 | | T1–T3 | TIP50 |
| R7 | 2.7 M | | Q1–Q4 | 2N7000 |
| R8 | 100 | | Q5 | 2N5086 |
| R9 | 100K | (2 watts) | Q6 | 2N5088 |
| R10 | 220K | | Q7 | TIP50 |
| R11 | 47K | (2 watts) | Diodes | |
| R12 | 15K | | D1 | 1N4007 |
| R13 | 3K | | D2 | BZT03C200 |
| R14 | 100 | | D3 | 1N4007 |
| R15 | 160K | (2 watts) | D4 | 1N5354 |
| R16 | 1 M | (1%) | D5 | 1N759 |
| R17 | 12.1K | (1%) | D6 | BZT03C200 |
| R18 | 13K | (½ watt) | D7 | LM385 |
| R19 | 1.8K | | D8 | 1N759 |
| R20 | 100 | (1%) | D9 | 1N914 |
| R21 | 200 | (1%) | D10 | 1N759 |
| R22 | 510K | | D11 | 1N914 |
| R23 | 220K | | Miscellaneous | |
| R24 | 820K | (¼ (watt)) | N1–N4 | CMOS 4001 |
| R25 | 1 M | (¼ watt) | U3 | MOC 3012 |
| R26 | 24K | | U4 | TO812 |
| R27 | 105K | | U5 | MOC3012 |
| R28 | 22K | | U6 | TD612DH |
| R29 | 240K | | U7–U10 | TLC27L4 |
| R30 | 5.9K | | U11 | TL431 |
| R31 | 5.9K | | U12 | MOC3012 |
| R32 | 1.5K | | U13 | TO2512MH |
| R33 | 1 M | | | |
| R34 | 100 | (¼ watt) | | |
| R35 | 100K | (2 watt) | | |
| R36 | 1 M | (¼ watt, .5%) | | |
| R37 | 12K | (.5%) | | |
| R38 | 2K | | | |
| R39 | 4.3K | | | |
| Capacitors (Microfarads) | | | | |
| C1 | 1 | (400 volts) | | |
| C2 | 2.2 | (25 volts) | | |
| C3 | .047 | (50 volts) | | |
| C4 | 0.1 | | | |
| C5 | .047 | | | |
| C6 | 1 | (400 volts) | | |
| C7 | .2 | (400 volts) | | |
| C8 | .1 | | | |

We claim:

1. An automatic line monitor for use in association with a power supply, the automatic line monitor comprising:
    a. means for receiving a first DC voltage input;
    b. means for receiving an auxiliary DC voltage input;
    c. a first comparator for determining when the auxiliary DC voltage input has reached a first minimum predetermined voltage;
    d. a second comparator for determining when the first DC voltage input reaches a first lower voltage range;
    e. a third comparator for determining when the first DC voltage input has reached a second higher voltage;
    f. a latch whose state is controlled by the second and third comparators depending on first DC voltage input;
    g. a first switch whose state is controlled by the state of the latch; and
    h. a second switch whose state is controlled by the first switch to affect the function of the power supply.

2. The automatic line monitor of claim 1 further comprising a third switch that varies the trip set-point of the third comparator in response to the state of the latch.

3. An automatic line monitor for detecting one of a high or low voltage ranges on an incoming line voltage comprising:
    a. a semiconductor device, the device including
        i. a first comparator responsive to a first line voltage trip set-point;
        ii. a second comparator responsive to a second line voltage trip set-point;
        iii. a third comparator coupled to the output of each of the first and second comparators to provide an indication when each of them has tripped;
        iv. a fourth comparator responsive to a third line voltage trip set-point;
        v. a latch coupled to the third and fourth comparators that latches when the higher voltage range is detected and remains unlatched when the lower voltage range is detected;
        vi. a first switch means coupled to the latch so that the switch closes when the lower voltage range is detected and remains open when the higher voltage range is detected; and
        vii. a second switch means coupled to the output of the latch to vary the trip set-point of the fourth comparator;
    b. a first power resistor coupled to an input of the third comparator to provide an input voltage indicative of the input line voltage;
    c. a second power resistor coupled to an input of the fourth comparator to provide an input voltage indicative of the input line voltage;
    d. a third switch means coupled in series with and activated by the first switch means; and
    e. a fourth switch means coupled to and activated by the third switch to effect a voltage doubling mode in the detected lower voltage range and a non-voltage doubling mode in the detected higher voltage range.

4. The automatic line monitor of claim 3 wherein the semiconductor is provided on a single semiconductor chip.

5. The automatic line monitor of claim 3 wherein the third switch means is an opto-coupler and the fourth switch means is a high-power triac.

6. The automatic line monitor of claim 3 wherein the first switch is a field effect transistor.

7. A method of effecting a voltage-doubling mode of operation of a power supply in response to a domestic range of line voltages and a non-voltage-doubling mode of operation of the power supply in response to an international range of line voltages, comprising the steps of:
   a. receiving a first DC voltage input;
   b. receiving an auxiliary DC voltage input;
   c. determining in a first comparator when the auxiliary DC voltage input has reached a first minimum predetermined voltage;
   d. determining in a second comparator when the first DC voltage input reaches a first lower voltage range;
   e. determining in a third comparator when the first DC voltage input has reached a second higher voltage range;
   f. latching the power supply in a non-voltage-doubling mode when the first DC voltage input has reached the second higher voltage range;
   g. switching a first switch whose state is controlled by the state of the latch; and
   h. switching a second switch whose state is controlled by the first switch to affect the function of the power supply.

* * * * *

UNITED STATES PATENT AND TRADEMARK OFFICE
CERTIFICATE OF CORRECTION

PATENT NO. : 4,933,832
DATED : June 12, 1990
INVENTOR(S) : Schneider et al.

It is certified that error appears in the above-identified patent and that said Letters Patent is hereby corrected as shown below:

On the front page, section [57], line 5, please replace

"of about 100 volts" with --of about 110 volts--.

In column 1, line 19; please replace "its respective half-cycle" with --its respective half-cycle.--.

Signed and Sealed this

Fourteenth Day of May, 1991

*Attest:*

HARRY F. MANBECK, JR.

*Attesting Officer*  *Commissioner of Patents and Trademarks*